United States Patent Office 2,950,245

Patented Aug. 23, 1960

2,950,245

METHOD OF PROCESSING MINERAL OILS WITH ALKALI METALS OR THEIR COMPOUNDS

Alfred M. Thomsen, 265 Buckingham Way, Apt. 402, San Francisco 27, Calif.

No Drawing. Filed Mar. 24, 1958, Ser. No. 723,140

4 Claims. (Cl. 208—348)

The expression "Mineral Oils" as used herein embraces principally crude petroleum, of whatever character and composition, and also those intermediate products derived from the distillation of coal, lignites, shales, and asphaltic aggregates such as "Tar Sands," bituminous diatomaceous earths, Gilsonite, etc. These intermediate products are generically referred to as "Tars" and differentiated from one another by the addition to said word of a prefix denoting the origin, as coal-tar, lignite-tar, etc.

All such substances are prepared for use in industry by some type of distillation wherein they are fractionated into specific ingredients or converted into other substances by the method known as "cracking," or, as is more general, by a combination of both. It is in this distillation step, or steps, that my process particularly applies. Obviously, when tars are involved, I refer specifically to a secondary distillation, not to the primary distillation to which they owe their origin. With such primary distillation I am definitely not concerned.

My process consists, in general, in conducting said distillation after commingling the oil with a re-cycled alkali metal, its oxide, hydroxide, carbonate or sulfide, or a mixture of all, and then after completed distillation recovering said alkali metal and/or its compounds from the carbonaceous residue, the so-called "coke" with which such a distillation must finish. A prime requisite of my process is, therefore, that said distillation must end with a coke phase, as it is from this mixture of carbon and alkali metal compound that the re-cycled material is once more regenerated. Because of cheapness, the alkali metal that will be preferred is manifestly sodium, but I do not confine myself to this limitation. Manifestly, potassium or even such rare substances as lithium and rubidium could be substituted although cost would make any substitution but that involving potassium impossible.

To clearly present my process I shall take a specific case setting forth in my narration the full embodiment of my process so that any skilled operator can be guided thereby in carrying out each and every step of said process. The oil will be a heavy oil with an asphalt base, containing much sulfur with a gravity of 25° or less, sulfur 2% or more, and yielding on final distillation 6% of coke on a Conradson test. To this oil I add an oil slurry, obtained at a later step in the process, which contains finely emulsified metallic sodium, sodium carbonate, and an indefinite compound containing sodium and carbon monoxide, presumably some type of a carbonyl. The metallic sodium and the sodium present in compound form are approximately equal in amount. I add this slurry in such an amount that the sodium, calculated as metal, shall be about 4% of the total oil, by weight, and adjust the amount afterwards by the actual distillation result.

As soon as commingling takes place, or at least after incipient heating, reaction takes place between the oil and the metallic sodium so that oxide and hydroxide of the metal are formed, and, at a higher temperature, sulfide appears. Distillation is next conducted in the conventional manner with an end point of approximately 800° F. for the distillate. This latter can be rather widely varied to suit the type of equipment available and is at the discretion of the operator. Said distillate is, of course, obtained in the form of low volatile fractions directly suitable for use after sweetening, and higher boiling material suitable as charging stock for catalytic cracking. All such matters are outside of the scope of this disclosure, save to say that both yield and quality are favorably affected by the presence of the sodium and its compounds in the distilling oil.

The residual material from said distillation is next "run to coke" in the conventional manner but now both the coke and the distillate form a part of my disclosure, as it is through these that re-cycling takes place. The part played by the coke will be considered first. It is divided into two parts, each part being treated in a diverse manner from the other. The first part is heated in a shaft furnace, preferably by electric heating, to temperature between a low of 1700° F. and a high of 2500° F., while traversed by a current of nitrogen. Sodium cyanide is formed from both carbonate and sulfide and the coke is, in part, consumed in the reaction. The cyanized coke is discharged continuously from the bottom of the shaft furnace and received into water in which the cyanide dissolves. Separation is next made between coke and solution and the latter is treated with gases containing carbon dioxide. Hydrogen cyanide is evolved, and sodium carbonate is formed, the former constituting a very valuable by-product.

The resultant solution of sodium carbonate is next evaporated to dryness, the solid salt mixed with a portion of the condensed distillate obtained from the coking step, and milled until of the consistency of a fine slime, the object being to have the sodium salt in as fine a division as possible prior to commingling with the raw charging stock for the initial distillation, this constituting the method whereby said sodium carbonate is re-cycled. At times, this sodium salt may contain some thiocyanate and if so then this ingredient will gradually increase in amount. It is, therefore, desirable to remove this salt perodically. It is done by evaporating the sodium carbonate solution to crystallization instead of to dryness, permitting said carbonate to crystallize leaving the thiocyanate, which is far more soluble, in the mother liquor, from which it is, of course, recoverable by conventional methods. In this manner, only a purified sodium carbonate will be re-cycled to the initial distillation step.

Further treatment of the second portion of coke will now be described. As before, it is also treated in a shaft furnace and heated to a temperature between 1700° F. and 2500° F. though no harm is done if the latter temperature be exceeded. Electric heating is preferred, and the coke is meanwhile traversed with a current of hydrogen gas which facilitates the volatilization of the metallic sodium produced in the reaction. Obviously, a portion of the coke is likewise consumed and carbon monoxide gas is produced, said gas mingling with sodium vapor and hydrogen. Said mixed gases on issuing from the furnace are scrubbed with the portion of the distillate from the coking step not utilized in milling the sodium carbonate prior to re-cycling. In this manner a slurry of oil, metallic sodium, and sodium combinations with carbon monoxide is formed and in this safe and convenient manner it is re-cycled to the initial distillation step.

As in the previous furnace operation, the unused carbon is received in body of water when discharged from the furnace. At times sodium sulfide may appear in this water, and if so then such a resultant sulfide solution is evaporated and the anhydrous sulfide added to the charge in the cyanide furnace operation. In both cases it is noted that an excess of carbon is discharged from the furnaces. By re-cycling said carbon to the furnace charge, or charges, it is obvious that the ratio of carbon to contained soda can be raised to any desired amount, after which the accumulating carbon must be discarded. It is essential that enough excess carbon be present so that the charge passing through the furnace shall be "dry," i.e., the reacting soda salts must be retained within the pores of the carbon so that no stickiness develops as the charge is passing through the furnace. An ideal ratio is four parts of carbon to one of sodium, calculated as metal, but this may be varied at the option of the operator in accordance with furnace behavior. Similarly, the re-cycled carbonate may be converted to hydroxide in conventional manner while still in the form of solution and then be re-cycled as a slurry of oil and finely ground hydroxide. All such minor alterations I regard as within the scope of my process.

By the practice of my invention I obtain more and better distillates throughout, partial if not complete desulfurization of same products, and in place of at least a part of the coke normally yielded I obtain cyanogen products of high market value. Inasmuch as the aromatics yielded in cracking in the presence of suitable catalysts, particularly ethylene, combine with such material, as hydrogen cyanide, to form products of even greater value in industry, this simultaneous production of aromatics and cyanogen compounds is most convenient. An example is the production in this manner of vinyl cyanide, $CH_2:CH\cdot CN$.

Having thus fully described my process, I claim:

1. The method of processing mineral oils which comprises: commingling said oil with a substance selected from the group consisting of alkali metals, alkali metal oxides, alkali metal hydroxides, and alkali metal carbonates as a re-cycled oil slurry; distilling said mixture to an end point of approximately 800° F. for the distillate and collecting the distillate; heating the residuum from such distillation until a coke residue is obtained and collecting the distillate produced; dividing said coked residue into two parts; furnacing one part at a temperature between 1700° F. and 2500° F. while traversed by a current of nitrogen until the contained alkali metal compounds are substantially converted to alkali metal cyanide, leaching the product thus obtained with water, passing gas containing carbon dioxide through the solution thus obtained until conversion from alkali metal cyanide to alkali metal carbonate, with attendant evolution of hydrogen cyanide, is substantially complete, dehydrating the resultant alkali metal carbonate, milling it in a portion of the distillate produced in the coking step to form a slurry and re-cycling said slurry by commingling it with fresh charging stock to undergo the initial distillation; furnacing the remainder of the coke produced in the coking step at a temperature between a low of 1700° F. and a high of 2500° F. while traversed by a current of hydrogen gas until the evolution of alkali metal vapor is substantially complete; scrubbing the gases produced in said furnacing with the remainder of the distillate obtained in the coking step, not employed in the before mentioned milling step, thus obtaining a slurry of oil, alkali metal and its alkali-carbon monoxide compounds, and recycling said slurry to fresh charging stock to undergo the initial distillation.

2. The method of processing mineral oils set forth in claim 1, with the added step that additional carbon be added to the material being furnaced so as to maintain a ratio of four parts of carbon to one of contained alkali, calculated as metal.

3. The method of processing mineral oils set forth in claim 1, with the added step that thiocyanates be removed from the re-cycled alkali carbonate as prescribed therein, prior to the milling step.

4. The method of processing mineral oils set forth in claim 1, with the added step that the re-cycled alkali carbonate prescribed therein be converted to hydroxide, by causticizing, prior to the milling step.

References Cited in the file of this patent

UNITED STATES PATENTS

| | | |
|---|---|---|
| 576,264 | Gilmour | Feb. 2, 1897 |
| 1,610,897 | Stalhane | Dec. 14, 1926 |
| 2,495,248 | Gagliardi | Jan. 24, 1950 |
| 2,586,030 | Groombridge et al. | Feb. 19, 1952 |
| 2,775,508 | Thomsen | Dec. 25, 1956 |